(12) United States Patent
Kenner et al.

(10) Patent No.: US 6,421,726 B1
(45) Date of Patent: *Jul. 16, 2002

(54) SYSTEM AND METHOD FOR SELECTION AND RETRIEVAL OF DIVERSE TYPES OF VIDEO DATA ON A COMPUTER NETWORK

(75) Inventors: Brian Kenner, Encinitas; Kenneth W. Colby, San Diego; Lonnie J. Brownell, Encinitas; Guy P. Weathersby, San Diego, all of CA (US)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/039,077

(22) Filed: Mar. 1, 1998

Related U.S. Application Data (60) Provisional application No. 60/039,086, filed on Mar. 14, 1997.

(51) Int. Cl.[7] .................. G06F 15/173; G06F 15/16
(52) U.S. Cl. .................. 709/225; 709/224; 709/219
(58) Field of Search .................. 709/250, 245, 709/244, 238, 235, 226, 228, 227, 224, 219, 217, 105, 225; 707/5, 104.1; 345/716, 717; 725/115

(56) References Cited

U.S. PATENT DOCUMENTS

| | | | |
|---|---|---|---|
| 5,488,609 A | * 1/1996 | Hluychyj et al. | 370/232 |
| 5,490,203 A | * 2/1996 | Jain et al. | 455/435 |
| 5,504,837 A | * 4/1996 | Griffeth et al. | 706/10 |
| 5,557,790 A | 9/1996 | Bingham et al. | |
| 5,574,903 A | * 11/1996 | Szymanski et al. | 707/1 |
| 5,655,117 A | * 8/1997 | Goldberg et al. | 395/613 |
| 5,737,495 A | * 4/1998 | Adams et al. | 707/5 |
| 5,793,966 A | * 8/1998 | Amstein et al. | 709/203 |
| 5,809,282 A | * 9/1998 | Cooper et al. | 395/500 |
| 5,812,529 A | * 9/1998 | Czarnik et al. | 370/245 |

(List continued on next page.)

FOREIGN PATENT DOCUMENTS

| | | | |
|---|---|---|---|
| EP | 0 384 339 A | | 8/1990 |
| EP | 0 674 259 A | | 9/1995 |
| WO | 91/11874 | * | 8/1991 |
| WO | 95/26114 | * | 9/1995 |
| WO | 96/09714 | * | 3/1996 |
| WO | 97/37500 | * | 10/1997 |

OTHER PUBLICATIONS

Baentsch, M. et al. "Introducing application–level replication and naming into today's Web," *Computer Networks and ISDN Systems*, vol. 28, No. 11 (May 1996).

Meyer, T., et al., "WAXweb: a MOO–based collaborative hypermedia system for WWW," *Computer Newtworks and ISDN Systems*, vol. 28, No. 1 (Dec. 1995).

(List continued on next page.)

*Primary Examiner*—Zarni Maung
*Assistant Examiner*—Jason D. Cardone
(74) *Attorney, Agent, or Firm*—David H. Judson

(57) ABSTRACT

A system and method for the selection and retrieval of various types of video data from distributed delivery sites calls for the deployment of "Smart Mirror" sites throughout a network, each of which maintains a copy of certain data managed by the system. Each "Smart Mirror" site maintains copies of the data in several alternative file formats. Every user is assigned to a specific delivery site based on an analysis of network performance with respect to each of the available delivery sites. Generalized network performance data is collected and stored to facilitate the selection of additional delivery sites and to ensure the preservation of improved performance in comparison to traditional networks. The appropriate file format is automatically selected based on the capabilities of a user terminal making a request for data.

4 Claims, 5 Drawing Sheets

U.S. PATENT DOCUMENTS

| | | | | |
|---|---|---|---|---|
| 5,832,221 | A | * | 11/1998 | Jones .......................... 709/206 |
| 5,918,012 | A | * | 6/1999 | Astiz et al. ............ 395/200.47 |
| 5,951,694 | A | * | 9/1999 | Choquier et al. .............. 714/15 |
| 5,956,716 | A | * | 9/1999 | Kenner et al. ................. 707/10 |
| 5,974,441 | A | * | 10/1999 | Rogers et al. ............... 709/200 |
| 5,991,809 | A | * | 11/1999 | Kriegsman ................... 709/226 |
| 6,003,030 | A | * | 12/1999 | Kenner et al. ................. 707/10 |
| 6,115,752 | A | * | 9/2000 | Chauhan ..................... 709/241 |
| 6,167,122 | A | * | 12/2000 | Titmuss et al. ........... 379/93.15 |
| 6,173,322 | B1 | * | 1/2001 | Hu .............................. 709/224 |
| 6,178,460 | B1 | * | 1/2001 | Maddalozzo et al. ....... 709/239 |

OTHER PUBLICATIONS

Braun, H. et al., "Web traffic characterization: an assessment of the impact of caching documents from NCSA's web server," *Computer Networks and ISDN Systems*, vol. 28, No. 1 (Dec. 1995).

"CyberMedia Oil Change software: How it works" Business Wire May 14, 1996.

* cited by examiner

SYSTEM AND METHOD FOR SELECTION AND RETRIEVAL OF DIVERSE TYPES OF VIDEO DATA ON A COMPUTER NETWORK

This application claims priority under 35 U.S.C. § 119(e) from Provisional Application No. 60/039,086 filed on Mar. 14, 1997.

The invention relates to a system and method for distributed data storage and retrieval, and more particularly, to a system and method whereby a user can acquire network performance information for a dynamic and distributed multipurpose network, and use this information to identify and select optimum delivery sites or servers from which to receive computer data, specifically multimedia content, as well as to select the particular type of multimedia content viewable by the user. Such delivery sites, servers, and content type are selected so as to increase network capacity, distribute server load, reduce transmission delays between the server and the user, and reduce obstacles to viewing the multimedia content.

BACKGROUND OF THE INVENTION

The Internet is a loose network of connected computers spread throughout the world. A message can be sent from any computer on the Internet to any other by specifying a destination address and passing the message from computer to computer via a series of "hops." Each computer, router, or "node" on the Internet has a unique Internet address. When an intermediate computer or router receives a message in transit, the computer checks the intended destination of the message and passes it along accordingly.

The Internet is growing, in terms of both size and sophistication, at a rapid rate. In the past, most users of the Internet were academic, research, or institutional users; the Internet was primarily used at that time to transmit and receive electronic mail and network news and to allow transfer of computer files. However, since the introduction of the World Wide Web (also known as the "Web" or the "WWW") several years ago, the Internet has begun to host increasing amounts of other types of data of general interest, namely representations of images, articles, etc.

The Web protocol and language establish a graphical means to navigate the expanses of the Internet. "Web pages," often consisting primarily of text and graphical material, are stored on numerous computers, known as "Web servers," throughout the Internet. A software program known as a "browser" can be used to access and view Web pages across the Internet by specifying the location (i.e. Internet address) of the desired Web page. When a Web page is accessed, its information is transmitted from the remote computer (server or delivery site), wherever in the world it may be located, across the Internet, to the user.

In recent times, the Web has begun to host highly sophisticated types of multimedia content, such as audio and video data, and computer software. Compared to first generation Web content, namely text and still images, audio clips, video clips, and software programs have extremely high storage and bandwidth requirements.

Before a video clip can be transmitted over a computer network, the clip must be digitized by encoding the video's analog signal to "1s" and "0s." In order to reduce the bandwidth required to transmit the digitized video, the video data stream is frequently compressed. Video compression is a process by which redundant data is eliminated from the video data stream so that the overall size of the data stream is reduced. There are many different compression formats which are used to reduce video data streams, e.g., MPEG, JPEG, H261, Indeo, Cinepak, AVI, Quicktime, TrueMotion and Wavelet.

Video clips received in a compressed format generally s must be decompressed before they can be viewed. Decompression of a video is commonly performed by a video player "CODEC" program, or COmpressor/DECompressor, often located at a user's multimedia terminal. Generally speaking, a single CODEC program can only recognize and decompress a single compression format.

When a video clip is stored for transmission in a format which can be decompressed by the CODEC at a user terminal, delivery of the video clip to the user can proceed smoothly. This is typically the situation where a subscription service provides video delivery over a confined network. The service provides a subscribing user with a preferred CODEC, and stores video clips in the compression format recognized by the provided CODEC.

However, when a service begins to make video clips available over the Internet, it is more likely that the video clips will be requested by a non-subscribing user whose multimedia terminal does not have the service provider's preferred CODEC. In this case, if the user wishes to view the video clips, he would be required to acquire or download a CODEC program capable of decompressing the desired video clip. Like video clip files, CODEC program files can be large files that take a long time to download. Moreover, a CODEC program can be difficult, time-consuming, or inconvenient to install onto the multimedia terminal. If a user is forced to download a CODEC program before he can play a video file, he may be discouraged from pursuing that particular video request any further.

At present, it is difficult, if not impossible, to provide sustained high-speed transmission of large audio/video files over a multi-node link on the Internet. Because the data is often transferred from afar, many factors can cause the delay or even loss of parts or all of a transmission. It is generally not critical if a user experiences minor delays in receiving small graphic or text files. However, it is recognized that real-time data such as video has very specific and stringent timing requirements for data transfer and display.

Unfortunately, the present design of traditional Internet-like data networks is based on the principle that delays and significant data transmission rate variations are acceptable for ordinary data (e.g. text and still images). Consequently, because of the high value of permitting access to text and graphical information from locations around the world, such transmission defects are considered acceptable, and the base capacity of the Internet is somewhat "oversubscribed" to reduce data transmission costs. In other words, the timeliness of network data transmission has been significantly compromised in order to render relatively insignificant the aggregate cost of long distance communication connections.

In order to successfully transfer audio-video data across a message-oriented network such as the Internet, for any more than a few users, network resources should be committed in a manner facilitating timeliness of transmittal. A system using committed network resources generally cannot take advantage of the existing pricing scheme of shared networks like the Internet, since it cannot participate in the sharing of network resources on a data packet by data packet basis. Video data must be transmitted to the exclusion of lower-priority data. Transmission costs thus become significant, especially when the connection is "long distance" or when the connection is continued over an extended period of time.

Another consequence of the timeliness vs. cost compromise discussed above has been the seemingly indiscriminate topographical design of the network. Since delays and throughput variations have traditionally been excused in favor of low cost, the configuration of the Internet infrastructure has also been driven by cost considerations. Accordingly, the interconnection efficiency of the network has rarely been considered. The rapid growth of real time data is changing this requirement.

It is recognized that inadequate data transfer performance of time-sensitive data on the Internet is typically caused by four factors: packet loss, excessive server utilization, the relatively low capacity of the network infrastructure, and inherent delays in the network hardware. Packet loss, in particular, is caused by inadequate infrastructure and lack of robustness in routing. The inherent delays are believed to be caused by, among other things, the lack of flow control between adjacent nodes in a multiple-node path on the Internet.

Unlike smaller text and graphic files, relatively large video files can take several minutes (or more) of "streaming," or constant data flow. Consequently, the usual network performance problems are exacerbated. Network bandwidth, or the data-carrying capacity of a particular network, is limited. Thus, packet loss and delays increase. Long delivery times consume a large amount of server capacity for a long time, decreasing the resources available to other users. Accordingly, because the network infrastructure becomes increasingly congested, packet loss and delays continue to increase, transmission times rise, and server load increases further.

This pattern exemplifies a "downward spiral" of network performance, which can be driven by the attempted transmission of large data files such as video clips. As long as network traffic remains within the limits imposed by network bandwidth, network performance will remain acceptable. However, whenever peak network loads exceed capacity, the downward spiral described above will begin, causing increasing periods of poor network performance.

As discussed above, a browser program can be used to access and view Web pages across the Internet by specifying the location (i.e. Internet address) of the desired Web page, or more commonly, by "hotlinking" to Web pages. Common browsers are Lynx, NCSA Mosaic, Netscape Navigator, and Microsoft Internet Explorer. The desired Web page is specified by a uniform resource locator ("URL"), indicating the precise location of the file using the syntax "http://internet.address/directory/filename.html".

Web pages are generally described, in terms of layout and content, by way of a language known as "HTML" (HyperText Markup Language). Any particular computer linked to the Internet can store one or more Web pages, i.e. computer files in HTML format, for access by users.

Hotlinking from one HTML Web page to another is accomplished as follows. The user first accesses a Web page having a known address, often on the computer located at the user's ISP (Internet Service Provider). The ISP is the organization providing Internet connectivity to the user. That Web page can contain, in addition to textual and visual data specified in HTML format, "links," or embedded information (in the form of URLs) pointing to the Internet addresses of other Web pages, often on other computers throughout the Internet. The user, by selecting a link (often by pointing and clicking with a mouse), can then access other Web pages, which can in turn contain further data and/or additional links.

Various extensions to HTML, such as Netscape's EMBED tag, allow references to other data to be embedded into Web pages. Some browsers are not capable of handling data other than text and images. Other browsers can handle the data in various ways. NCSA Mosaic, for example, handles references to unknown types of data by allowing the data to be downloaded to the user's computer, and then optionally invoking an external program to view or manipulate the data. Recent releases of Netscape Navigator and Microsoft Internet Explorer take the concept one step further: a browser extension, or "plug-in," can be automatically invoked to handle the data as it is received from the remote Web page. Other means, such as network program "applets" written in the Java language (or a similar language), can be used to extend the functionality of the browser environment or network.

Digital multimedia data can have extremely high storage and bandwidth requirements. In particular, video files can be very large, from approximately 10 megabytes to 10 gigabytes. In order to play video files at speeds approaching their recorded rate at a user's terminal, the files have to be delivered at a fast, constant speed. Too slow, and the image plays back slower than originally recorded. If the speed is uneven, then the video appears jerky, like an old-time movie.

The network design compromises discussed above generally adversely impact the transmission of audio and video data across the Internet. While a user using a browser to "surf" the Web might not notice minor delays and transmission rate variations while retrieving text and still images, such defects become apparent and significant when real-time audio and video information is accessed.

In an attempt to solve these problems, Internet content providers sometimes spread popular content around the Internet on various servers or delivery sites known as "mirror sites." Each mirror site contains information that is essentially identical to that of the original site. For example, if a popular Web site is located in New York, mirror sites might be located in Los Angeles, London, and Tokyo. Accordingly, if a European user is having difficulty accessing the original New York site, he can hotlink to the mirror site that is geographically closest, i.e. London.

However, mirror sites have several disadvantages. For example, mirror sites may be widely distributed geographically, but may not be efficiently distributed on the network in terms of actual usage, network traffic, etc. Thus, New York and Los Angeles mirror sites might both be connected to the same national Internet service provider's network, meaning that difficulty in accessing one of the sites might also affect the other.

Furthermore, mirror sites might not be optimally placed to reduce load on each server. Although an "educated guess" might be made as to where a mirror site should be located, actual usage patterns might differ. Furthermore, there is no guarantee of enhanced performance. The bandwidth of the mirror site might be lower than that of the original site, or it might be overloaded for other reasons.

Moreover, mirror sites are often hosted on a voluntary basis. If a Web site is extremely popular, and a service provider determines that the subject matter might be of interest to its subscribers, that service provider might agree to host a mirror site of the original Web site. Such an arrangement would be attractive to host of the mirror site because people would be drawn to the mirror site, and might hotlink to other content hosted there. On the other hand, such voluntary alliances typically are not reliable and might be severed at any time.

In essence, a mirror site offers a secondary source for data, which may or may not be available, and which may improve user convenience, but which does not address network bandwidth or efficiency. A mirror site does not account for performance characteristics of the network, nor identify available bandwidth which could be used to efficiently transmit video data while still taking advantage of the existing low-cost pricing schemes such as those on the Internet.

Currently, there is no guidance in selecting optimal locations for delivery sites, nor is there a known method permitting a user to determine which mirror site to connect to that will ensure optimum performance. In fact, the use of a traditional mirror site is voluntary. Typically, a user will try to access the original site (or a known mirror site), and will switch to another mirror site only if performance is found to be insufficient after one or more attempts. This approach is an inefficient utilization of network resources. Clearly, mirror sites are not an optimum solution to the problem of overloaded Web sites. A principal reason for this, among others, is the failure to consider network performance.

Network analysis, particularly the performance of specific paths and links over the Internet, is well known and developed. For example, the "ping" program allows a computer connected to the Internet to determine whether a remote host is accessible. However, the ping program uses a low-priority network protocol known as the ICMP protocol, and accordingly does not provide meaningful performance analysis information. The "traceroute" program follows the transmission of a message from a computer to a remote host, tracking delays along each link, and determining the path taken by the message. The traceroute application can be used to map the flow of data. However, it lacks the ability to provide meaningful performance analysis information. Traceroute only provides route information for a message propagating in one direction, and only for one instant in time.

Moreover, only the connectivity characteristics of paths leading to and from the single computer running the tests are typically determined; expanding the scope of testing is possible but logistically impracticable, since the Internet is so large.

Traditional network analysis techniques such as the "ping" and "traceroute" programs offer a view of network connectivity but provide little understanding of what performance can be expected from providers and mirror sites across the Internet. Therefore, only "guesses" can be made as to where delivery or mirror sites should be located or which mirror sites should be used to optimize performance.

Since video delivery over the Internet has quickly gained in popularity, a need exists for a system that can make sure that a user's video request can, in most cases, be satisfied by video clip stored in a compression format recognized by a CODEC on the user's terminal, thereby eliminating or reducing the user's need to download a new CODEC program.

A further need exists for a method of determining overall network performance. A further need exists for a system applying that method to enable content providers to dynamically locate data delivery or mirror sites at optimum network locations, and to allow users to select optimum mirror sites from which to receive data.

SUMMARY OF THE INVENTION

The invention is directed to a system and method for the optimized distribution of Web content to and from sites located around the Internet. An intelligent mirroring scheme, called here "Smart Mirroring," is used to determine the need for and distribution of mirror sites and to direct user requests for certain Web content to an optimum mirror site. A format selection scheme is used to automatically select a video clip file compressed in a format recognized by a CODEC program already installed and operative on a user terminal.

A number of "smart" delivery or mirror sites are used to distribute popular Web content to various parts of the Internet. A comprehensive scheme of network analysis, based on tests performed by a large number of users, is used to interactively determine the preferred locations for the sites, and to determine the optimum sites to be used by each individual user.

Accordingly, because each individual user is routed to a Smart Mirror or delivery site that provides improved performance, overall network congestion is reduced. In most cases, the improved server is located electronically close to a user in order to decrease the number of network connections over which data must travel, thereby reducing packet loss and delay.

Furthermore, network analysis results allow message traffic to be routed away from those delivery sites and network regions that are already overloaded, and toward underutilized servers and networks. This results in an improvement in throughput as seen by each user, and will thereby increase the appeal of the content offered by content providers using the system. Content providers are able to reach a larger number of users across the Internet without suffering significant decreases in performance.

A system according to the invention begins with an original Web site and at least one additional delivery (or mirror) site. Each user desiring to use the system will be provided, in a preferred embodiment, with software which includes a configuration utility and a client program. The configuration utility is used first to determine which delivery sites provide improved performance for that particular user.

In one embodiment of the invention, the configuration utility first downloads a "delivery site file" from a service provider. This delivery site file contains a list of available delivery sites and a list of network tests to be run. The types of tests and frequency of testing to be performed may be specified in the delivery site file, as dependent on the number of users testing the network and the estimated drain on network or delivery system capacity.

The configuration utility will run a subset of the tests specified in the delivery site file. The test results show which delivery sites yield improved performance for the user, and also contain information on various generalized network capabilities from the standpoint of the user running the tests. The network test results and the identity of the chosen delivery site will be sent (via e-mail in one possible configuration) back to the delivery service provider for incorporation into the service provider's database.

The delivery site chosen by the configuration utility is then used by that user for the retrieval of all content managed by the delivery system service provider. Consequently, when the user is browsing Web content, and finds a particular item, e.g. a video clip, that is managed by the service provider's delivery system, the client software will automatically retrieve it from the specified "Smart Mirror" delivery site. Site preferences and default sites can be updated periodically on request, at specified times, or in response to changes in network load and traffic.

Moreover, because the configuration utility of the invention is performing various network tests and providing the test results to the service provider, valuable data on system and network performance is available. Such data provides information on which "Smart Mirror" delivery sites are performing effectively and which are not, which Smart Mirror delivery sites are overloaded, and what portions of the Internet might benefit from the addition of more delivery sites or capacity.

Such data also makes it possible to perform such sophisticated network analysis as end-to-end performance measurements, workload characterization, route stability, and outage metrics. Thus, from an engineering standpoint, the mirror service provider can continue to ensure that improved performance is being provided. From a marketing perspective, content providers can be told where to locate Smart Mirror or delivery sites for improved performance, and what ISP provides improved delivery.

A Web page hosting an embedded video clip also includes code to activate the Smart Mirroring and format selection schemes. Accordingly, a video clip selection and retrieval system according to the invention stores each video clip at various locations in a number of different compression formats. A format selection module comprises software programs that instruct the user terminal to determine which CODEC programs are installed at a user terminal, select a preferred CODEC for use, locate video clips stored in a compression format recognized by the preferred CODEC, and redirect or modify a video request so the video delivery system can locate and retrieve the desired clip. Where no appropriate CODEC is detected, the format selection module prompts the user to download and install a preferred CODEC.

In a first embodiment of the format selection module, a video clip is stored in a number of different compression formats at individual delivery sites connected to the Internet. The video clip and its address are referenced on a Web page providing access to the server. The Web page also contains an embedded software program for querying the user terminal to determine what CODECs are installed at the terminal. The embedded program is automatically executed when the user requests a video clip which is referenced on the Web page. If the query detects the presence of a CODEC that can decompress a video clip stored by one of the servers, the embedded program will select that CODEC and request the appropriate video clip.

In a second embodiment of the format selection module, a relatively small program is installed on the browser as a "plug-in" or the like. The "plug-in" embodiment performs the same functions as the embedded software program described in the preceding embodiment and has the added functionality of interacting with the Smart Mirror facilities discussed above.

DETAILED DESCRIPTION OF THE INVENTION

The invention is described below, with reference to detailed illustrative embodiments. It will be apparent that the invention can be embodied in a wide variety of forms, some of which may be quite different from those of the disclosed embodiments. Consequently, the specific structural and functional details disclosed herein are merely representative and do not limit the scope of the invention.

Figure 1:
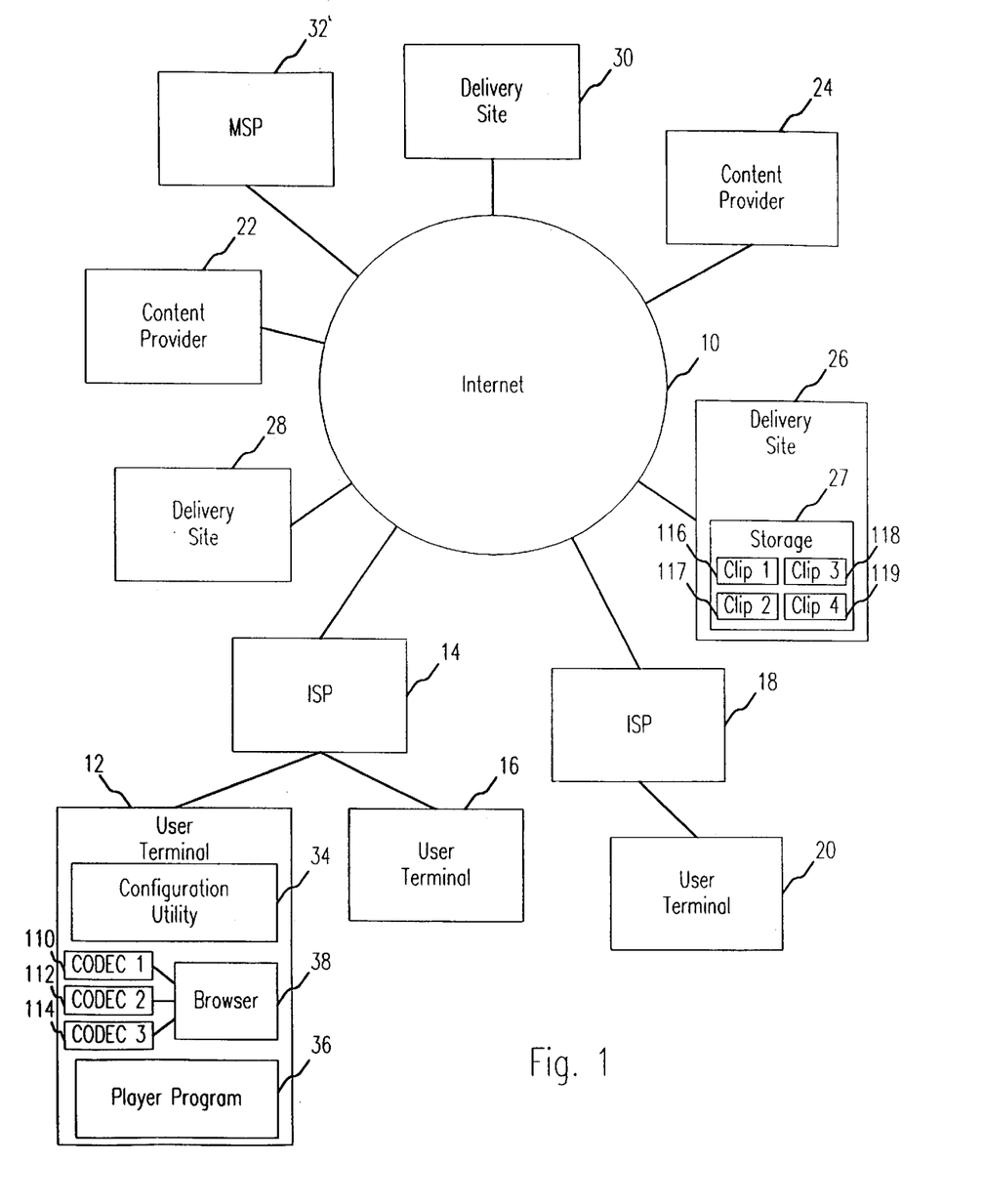
FIG. 1 is a block diagram of an illustrative network topology of a system according to the invention, including multiple users and multiple content providers.

Referring initially to FIG. 1, the Internet 10, which is intended to be representative of wide-area communications networks in general, is depicted as a "cloud." The Internet is known to be an interconnected network of a large number of computers. Although Internet-connected computers that are "geographically" near each other can be "electronically" near each other on the Internet, such is not usually the case. However, one computer connected to the Internet can communicate with any other computer connected to the Internet; the message will most likely travel over a path comprising a sequence of links, or "hops," between computers that are directly connected to each other.

A first user terminal 12 is also depicted in FIG. 1. The first user terminal 12 is connected to an Internet service provider (ISP) 14, which is typically just a computer, router, or terminal server connected to the Internet 10. An ISP 14 can host additional user terminals, such as a second user terminal 16. Other ISPs, such as a second ISP 18, are also connected to the Internet 10. A third user terminal 20 is shown connected to the second ISP 18. Only three user terminals are shown; however, it should be recognized that the number of concurrent users of the invention is unlimited, subject to the operational details set forth below.

As is known in the art, content providers are also connected to the Internet 10. A first content provider 22 might provide a certain kind of content, for example sports scores and highlights. A second content provider 24 might provide a different kind of content, for example business news. Traditionally, if a user (such as the one using the first user terminal 12) wished to access the content provided by the first content provider 22, the terminal 12 would query the first content provider 22 directly. A request message would propagate from the terminal 12, across the Internet 10, to the content provider 22. The content provider 22 would send the desired data across the Internet 10 back to the terminal 12.

Several delivery, or "mirror" sites are shown connected to the Internet 10 in FIG. 1. A first delivery site 26 might be located a small number of "hops" from the first user terminal 12. The first delivery site 26 includes a storage module 27 for storing content such as audio/video clips. A second delivery site 28 might be located further away from the first user terminal 12, but close to the third user terminal 20. A third delivery site 30 might be as close to the third user terminal 20 as the second delivery site 28 is. As previously noted, a user and a provider or delivery site that are "geographically" near each other might not be "electronically" near each other on the Internet. By decreasing the "electronic" distance between the user and the provider or delivery site, the number of network connections and routers over which data must travel can be decreased.

As discussed above, the Smart Mirroring system acts to improve network performance by decreasing the incidence of the foregoing network problems. Packet loss and delay problems are generally decreased by reducing the number of network connections over which data must travel, although in some cases, the network testing procedure of the invention shows that some longer paths provide better throughput than some shorter paths. Very little packet loss, and essentially no delay, occurs in network cable; it typically is caused by overloaded network storage and routing devices. Because the Smart Mirror sites of the invention are located electronically near each user, packet losses and delays are reduced. The problem of excessive server utilization is reduced because multiple delivery sites share the load that typically would have been handled by a single server. The relatively low capacity of the network infrastructure becomes less of a problem, because data retrieved from parallel delivery sites in different locations generally need not travel over the same network links.

For the purposes of describing this invention, a delivery site is a "node" on the network which may store data or other files, such as software code, for delivery. The term can also include a site which is responsible for data delivery, including mirror sites, content providers, and servers for broadcast video streams or Web sites.

In the system, a mirror service provider (MSP) 32 is connected to the Internet 10. The MSP 32, which exercises a management function over the distribution of delivery sites 26, 28, and 30, and over the allocation of requests to the original and delivery sites from user terminals 12, 16, and 20, includes a database capable of transmitting and receiving data over the Internet 10.

This management function is facilitated by the use of a configuration utility 34 and a client program 36 run within a storage medium (i.e. random access memory) on the user terminal 12. Although the configuration utility 34 and the client program 36 are shown in FIG. 1 as a part of only the first user terminal 12, it should be recognized that any user terminal, such as terminals 16 and 20, participating in the system will use such software. A user desiring to participate in the system can obtain the software comprising the configuration utility 34 and client program 36 directly from the MSP 32, or through traditional retail or other channels (such as being part of the browser or operating system of the computer). It should be noted that the functions performed by the configuration utility 34 in the described embodiment of the invention can be integrated into general Internet application software, such as a browser or other network application; a stand-alone program is not necessary.

Configuration Utility

In a preferred embodiment, the configuration utility 34 must be run by the user, either by command or automatically, before the user terminal 12 will have access to the system. The operation of the configuration utility 34 is shown in detail in FIG. 2.

Figure 2:
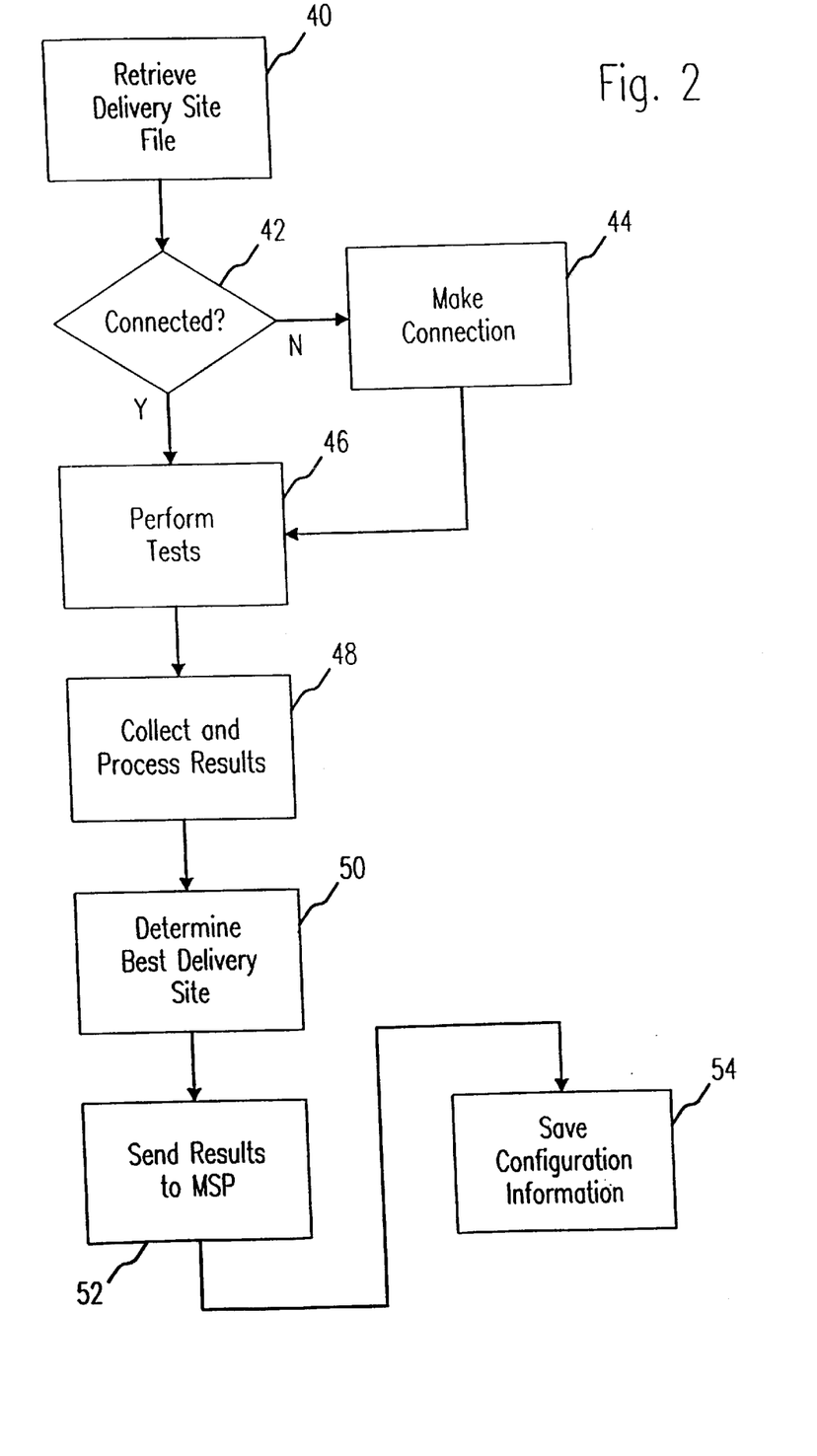
FIG. 2 is a flowchart describing the operation of the configuration utility used in a system according to the invention.

The configuration utility 34, when first run on the user terminal 12, retrieves a delivery site file (step 40) from the MSP 32 (FIG. 1). If the user already has a delivery site file (e.g., it was received with the configuration utility 34), and that delivery site file is sufficiently new, the delivery site file can be retrieved from the local hard disk of the user terminal 12. This delivery site file contains a list of all available delivery sites (such as delivery sites 26, 28, and 30) and a list of network tests to be run at the user terminal 12. In the context of the invention, there can be as few as two delivery sites, or if the number of users justifies it, as many as several thousand. The number of sites in principal is unlimited, with each available delivery site represented in the delivery site file.

The delivery site file is generated by the database from within the MSP's computer system. The database application uses information about the user to dynamically determine the optimum tests to run. Consequently, the delivery site file need not contain entries for every delivery site in existence; the list can be tailored to include only those sites which appear appropriate or feasible.

Initially, the magnitude of run-time variation in test configurations for the delivery system users is low; that is, the first group of users all run essentially the same tests. As the delivery service grows, however, the intensity of each user's testing is reduced in order to compensate for the increased magnitude of testing network-wide. The scope of testing and the number of delivery sites tested both can be narrowed to further reduce the aggregate load of network testing.

In one embodiment, the delivery site file will have a format generally as follows:

1. File Revision Number and Message. The file includes this field to determine whether a new version of the configuration utility 34 is available. If the revision number in the delivery site file is higher than the version number for the configuration utility, configuration is not allowed. Instead, the user would be prompted to acquire a newer version of the configuration utility 34. File revision verification as described herein ensures that the most up-to-date delivery site selection algorithms are applied to the test data generated by the configuration utility 34.

2. A list of available Smart Mirror delivery sites. For each available delivery site, the following information is provided:
   a. Host name. In the known Internet format of "www.server.com."
   b. IP Address. A numerical Internet address in the known format. The address is presently a 32-bit number of the form w.x.y.z., where w, x, y, and z are each in the range of 0 to 255.
   c. Alternate Name. An informal name such as "The First Mirror Site."
   d. A list of tests to be executed. For each test, the following information is provided:
      i. Test ID. Each type of test has a unique identifier known to the configuration utility 34.
      ii. Weighting factor. Each test will be weighted by a specified percentage.
      iii. Frequency. Each test is not necessarily run every time. This field specifies a probability, determining how often a particular test will be run.
      iv. Additional Information (optional). For certain tests, additional information may be needed.
   e. Site Preference Level. Each site can be given a weighting, or preference level, between, for example, 1 and 100. As discussed below, aggregate data in the MSP's database is used to perform network usage analysis not possible with only the single user's instantaneous end to end testing. The weighting factor provided here is used to incorporate the test results received from the service provider's database. This weighting factor is also used to limit assignment of new users to a delivery site once a predetermined maximum usage level has been reached.
   f. Test Site Flag. If this flag is enabled, the foregoing tests will be run, but the site will not be assigned as a delivery site even if it yields the best performance.
   g. Content Provider Groups. Each site can belong to one or more content provider groups, thereby mirroring only certain content. If a user is not interested in the types of data hosted by a particular delivery site, then it does not need to be tested.

The configuration utility 34 then queries the user (step 42) for various items of information needed in the configuration process, for example, the user's name, e-mail address, password, modem speed, and information related to access control (e.g. what levels of various attributes are viewable by the user). The access control mechanism will be discussed in further detail below. In one embodiment of the invention, the information received from the user is encrypted and stored in a configuration file on the user terminal 12.

The configuration utility 34 then determines whether the user terminal 12 is connected to the Internet (step 42). If not, it will initiate a connection (step 44) or prompt the user to do so.

A series of network tests is then performed (step 46). One or more tests can be performed for each available site listed in the delivery site file; not all sites in the file need to be tested.

The following test types are presently considered to provide useful data:

1. Ping. Provides information on whether a remote server is reachable, and if so, how long it takes for a low-priority message to travel round trip from the user terminal 12 to the remote server and back. Ping is a simple test useful in deciding whether a site is available for further evaluation. Excessive times returned by the ping application can be used to eliminate delivery systems which are far too "slow" for effective information delivery. This test is used by the terminal to reduce the number of delivery sites tested.

2. Traceroute. Provides information on what route is taken by a message from the user terminal 12 to a remote server, including what systems are used along the way, and how long each hop takes. Traceroute is used by the configuration program 34 to document the path of information transmission. Several traces with differing results might indicate that the stability of the route from a particular user to a specific server is not acceptable. Previously aggregated data on particular routes, from the service provider's system database, may also influence the decision to choose a particular delivery site for a specific user. Route stability is the primary consideration.

3. Reverse Traceroute. Provides information on what route is taken by a message from a remote server to the user terminal, including what systems are used along the way, and how long each hop takes. Reverse Traceroute is used by the configuration program to document the path of information receipt. Several traces with differing results might indicate that the stability of the route from a particular server to a specific user is not acceptable. Previously aggregated data on particular routes, from the service provider's system database, may also influence the decision to choose a particular delivery site for a specific user. Again, route stability is the primary consideration.

4. Dynamic Traceroute. Similar to traceroute or reverse traceroute, but between any specified pair of computers on the Internet. Dynamic Traceroute is used by the configuration program to document a path of information transmission. Several traces with differing results might indicate that the stability of the route between two network locations is not acceptable. Previously aggregated data on particular routes, from the service provider's system database, may also influence the decision to choose a particular delivery site for a specific user. As above, route stability is the primary consideration.

5. Name Server Resolution Delay. If the numeric Internet address is unspecified, a name server lookup is performed to determine what numeric address corresponds to the desired host name. This process can take a substantial amount of time.

6. Throughput. A sample file is downloaded, or partially downloaded, from the remote server to determine the actual throughput in bytes per second.

7. Throughput variation. A sample file is downloaded, or partially downloaded, from the remote server to determine if the throughput is relatively constant or fluctuating.

8. Error rate. A sample file is downloaded, or partially downloaded, from the remote server to determine if the transmission is subject to transmission errors. This information is obtained by counting the number of error message packets returned to the user, thereby learning of the error rate from the user to the server, and by tracking the number of bytes received as a fraction of the number of bytes transferred, thereby learning of the error rate from the server to the user.

9. Packet Fragmentation. A sample file is downloaded, or partially downloaded, from the remote server to determine it the transmission is subject to fragmentation or out-of-order packet reception.

10. Capacity Query. If the remote server is so enabled, the configuration utility 34 queries the server to determine its transmission capacity and its average load. This information is collected via the Simple Network Management Protocol ("SNMP"), which is supported by nearly all Internet servers.

11. Macroscopic Network Analysis. The data accumulated by the MSP database offers a global view of network behavior. This information permits the Smart Mirror system user to have a historical view of the performance of the available delivery sites. The accumulated data is manipulated by the delivery system database to analyze network performance, in order to emphasize usage in high-capacity areas of the network, while deemphasizing usage in areas already experiencing diminished performance.

Information on how each of the foregoing tests are performed is well known in the art of network analysis. See, e.g., Bob Quinn and Dave Shute, *Windows Sockets Network Programming* (Addison-Wesley 1996). In one embodiment of the invention, testing is accomplished by performing a "ping" test to verify whether a server is reachable, a series of small (e.g. 20K) downloads, a series of large (e.g. 200K) downloads, and "traceroute" and "reverse traceroute" tests to document delivery paths.

The traceroute information is used by the MSP 32 to correlate test data to information in its database; in that way, particularly bad network links and servers can be identified. Such information is provided in the delivery site file discussed above; if a particular link or server is known to be unreliable, based on information obtained from other users, an individual user can be routed away from it, even if a single test gives good results.

The short downloads are used to determine server capacity. The name server resolution delay can be determined by such a test, as well as the time it takes a server to begin sending data. The later result is strongly related to server load, capacity, and performance.

The long downloads allow the configuration utility 34 to determine how packet loss, network congestion, and server utilization affect file delivery. It is not ideal to determine which of the foregoing factors is causing decreased performance based on test results from a single user. However, such results in the aggregate, as stored in the database maintained by the MSP 32, indicate the root causes.

It should be noted that some of the test results may be used in conjunction with other test results. For example, the load on a delivery site as determined through a capacity query can be divided by the results of a throughput test to derive an average expected download time, given the load characteristics of the server.

After all specified tests are run, the results are collected and processed (step 48). It is possible that certain tests were not able to be successfully performed; in such cases, the results should indicate an appropriate worst-case value (e.g. zero throughput or extremely high delay).

It is important to note that not all possible tests will be performed each time the configuration utility 34 is run. When a large number of users is using the system, a substantial drain on server and network capacity would be caused by the testing procedure alone, increasing the downward spiral of network performance previously discussed.

As noted above, a test frequency number is stored in the delivery site file for the purpose of dynamically controlling the number of users performing a test. The testing performed by the configuration utility 34 is performed to achieve statistical confidence in deciding which delivery site is best suited for data delivery to a particular user. Statistical confidence is obtained by either testing a small sample of users sufficiently well and using that data to influence the choice of a delivery site, or by having a large number of users each "lightly" test several available sites and using that data in the aggregate.

Accordingly, when the system is used initially, a relatively small number of users are "enrolled" in the system. The delivery site file maintained by the MSP 32 reflects those conditions, and requires each user to test the network (through the configuration utility 34) relatively heavily. As the number of users increases, the delivery site file is modified to decrease the tests performed by each user. By the time a very large number of users are using the system, the configuration utility 34 may predominantly test for delivery site reachability (via a "ping"-type test, as discussed above), and rely primarily on test data provided by other users and stored in the database maintained by the MSP 32. However, even when many users are testing the system, a small number of users (e.g. one in 5,000) may be selected to run a comprehensive set of tests.

Preferably, testing should not contribute more than approximately 5% of total server load. One way to reach this goal is to lightly test a large number of servers, yielding a group of delivery sites having adequate performance. This group of delivery sites can then be used in rotation to retrieve data. Information on multimedia clip actual download times for each of the delivery sites in the group is accumulated as discussed below, and further information on delivery site performance can then be furnished to the MSP 32 transparently, without the need for further outright testing.

Accordingly, on the basis of the collected test results, and on information provided in the delivery site file by the MSP 32, the configuration utility 34 determines which delivery site, or group of delivery sites, is best for the user terminal 12 (step 50). This determination can be made numerically by weighting the various tests performed and comparing the score for each site.

In a presently preferred embodiment, for use in a low-traffic environment with a relatively small number of delivery sites and users, the configuration utility 34 relies primarily on ping and throughput tests for each available delivery site. An initial ping test is performed to determine if a delivery site is reachable. Short and long downloads are performed in the throughput tests to determine the maximum and minimum throughputs from the delivery site, and to determine whether throughput variation is small enough to accommodate the transmission of video data. Accordingly, those tests are all given high weights. Other tests, such as traceroute, can be performed, and the results reported to the MSP 32, without playing a role in the choice of delivery sites (such other tests can be given weights of zero, or nearly zero, for example). As the size of the system increases, and additional delivery sites and users are enrolled, the site selection formula can be altered, by changing the delivery site file contents, to reflect changing network conditions.

In one embodiment of the invention, a proprietary graphical interface is provided so that the location of the user and the locations (both geographic and electronic) of each site tested can be displayed on a monitor connected to the user terminal 12, allowing a visual indication of the relative distances between sites. In one embodiment, the display is shown in the form of a "radar screen," upon which the user terminal 12 and delivery sites are displayed as "blips" superimposed over a map of the pertinent geographical region. In order to encourage the user to use the application and to offer more network-wide data, the user interface can allow the user to enter an "ad-hoc" test site for additional performance testing. In this case, the configuration utility will test either the default Web page file (e.g., "index.html") or a specific file requested by the user. Analysis results from the user-selected site are adjusted so that reasonable comparisons can be made with results from other sites.

It should be noted that multiple sets of delivery sites can be maintained by the invention, to accommodate several groups of content providers. Each content provider might be mirrored only at certain sites. Accordingly, for each content provider having a unique set of delivery sites, a primary delivery site is selected by the configuration utility 34. To accomplish this, the foregoing tests can be run once, and then, in one embodiment, a numerical weighting can be applied to each appropriate set of delivery sites. A plurality of Smart Mirror sites is selected, one for each content provider group. The content provider groups is specified in the delivery site file; each possible delivery site is identified as belonging to one or more content provider groups. When content provider groups are used, there can be as few as two groups; the maximum number is essentially unlimited.

It should also be noted that a prioritized ranking of delivery sites can also be generated and maintained. If this is done, failure of the primary Smart Mirror site to respond will allow the system to fall back to the next-highest ranked Smart Mirror site.

After a Smart Mirror site is selected, certain data will be sent to the MSP 32 (step 52) via e-mail or other Internet electronic protocol. The information received by querying the user, the identity of the selected Smart Mirror site, and all raw test data and results, including the time and date at which each test was run, is compiled into a text file (which is encrypted in one embodiment). Upon receipt by the MSP 32, the data is stored in a database for use in managing and analyzing the system.

Finally, the configuration utility 34 saves the identity of the selected Smart Mirror site for each set of delivery sites, or the prioritized list, to the (encrypted) configuration file (step 54). The configuration utility may also save information on relative performance for each tested delivery site. The client program 36 uses the encrypted configuration file to download data files (video clips or other content) from the appropriate Smart Mirror site.

It should be noted that in the operation of the system, the MSP 32 performs certain functions. The MSP 32 maintains the delivery site list, adding and deleting sites as necessary.

The MSP 32 also maintains the database of network performance, containing information received via e-mail or other means from users running the configuration utility 34. As large amounts of data are received from numerous users, the database can provide valuable information on the performance and other characteristics of the Internet and portions thereof. Various data processing techniques are known to derive such information.

The locations of the delivery sites used with the invention are ultimately determined by a number of factors, including marketing considerations and cost/benefit analyses. However, the data stored in the MSP's database can confirm the utility of placing a delivery site at a given location on the Internet or other network. In one embodiment, servers are located on each major backbone (portion of the Internet maintained by a single corporation) and on other Internet lines serving large numbers of users, such as the major lines operated by the Regional Bell Operating Companies ("RBOCs"). In certain networks serving large numbers of users or having heavy video delivery traffic, servers can be placed at major Points of Presence ("POPs") for the network to ensure that each user has excellent to a fast server.

Once the configuration utility 34 has been run, the user can use the system to enable and facilitate the receipt of data files, specifically video clips, audio clips, software programs, and other content.

As time passes and the usage patterns of a user's region of the Internet change, the user might become dissatisfied with the performance of the Smart Mirror site associated with his user terminal 12. If that happens, the user is free to re-run the configuration utility 34. By that time, additional delivery sites might have been placed into service, or a different pre-existing site might perform better than the one previously assigned. Furthermore, if the player program 36 determines that the selected Smart Mirror site is not performing adequately (e.g., it has failed three times out of ten attempts), the player program 36 can prompt the user to re-run the configuration utility 34. In another embodiment of the invention, the testing and mirror assignment is run automatically with each request for a file on the Smart Mirror service or at some intermittent times such as after every other, every third, every tenth or every one hundredth request.

Smart Mirroring

In one embodiment of the invention, the Smart Mirror system is used to locate a delivery site from which to download a video or audio clip ("clip") referenced on a Web page. In this embodiment, the client program can be referred to or considered a "player program." The player program, in addition to carrying out the functions of the client program 36, enables the retrieval and playback of video data. Ordinarily, a browser program 38 is run on the user terminal 12 to view Web content. Browser programs typically used include NCSA Mosaic, Netscape Navigator, and Microsoft Internet Explorer. The browser program 38 allows the user to hotlink among various Web sites on the Internet.

The EMBED tag is used within HTML documents to indicate which Web pages include content managed by the system. When the browser program 38 receives a Web page containing an EMBED tag, a download of the file referenced by the tag is commenced, and the file type is analyzed. If the file is of a type handled by the player program 36, e.g. MPEG, the browser program 38 initiates the player program 36. The contents of the tag are then passed by the browser program 38 to the player program 36.

The player program 36 (FIG. 1) provides the Smart Mirroring services facilitated by the MSP 32. The operation of the player program 36 is shown in detail in FIG. 3.

Figure 3:
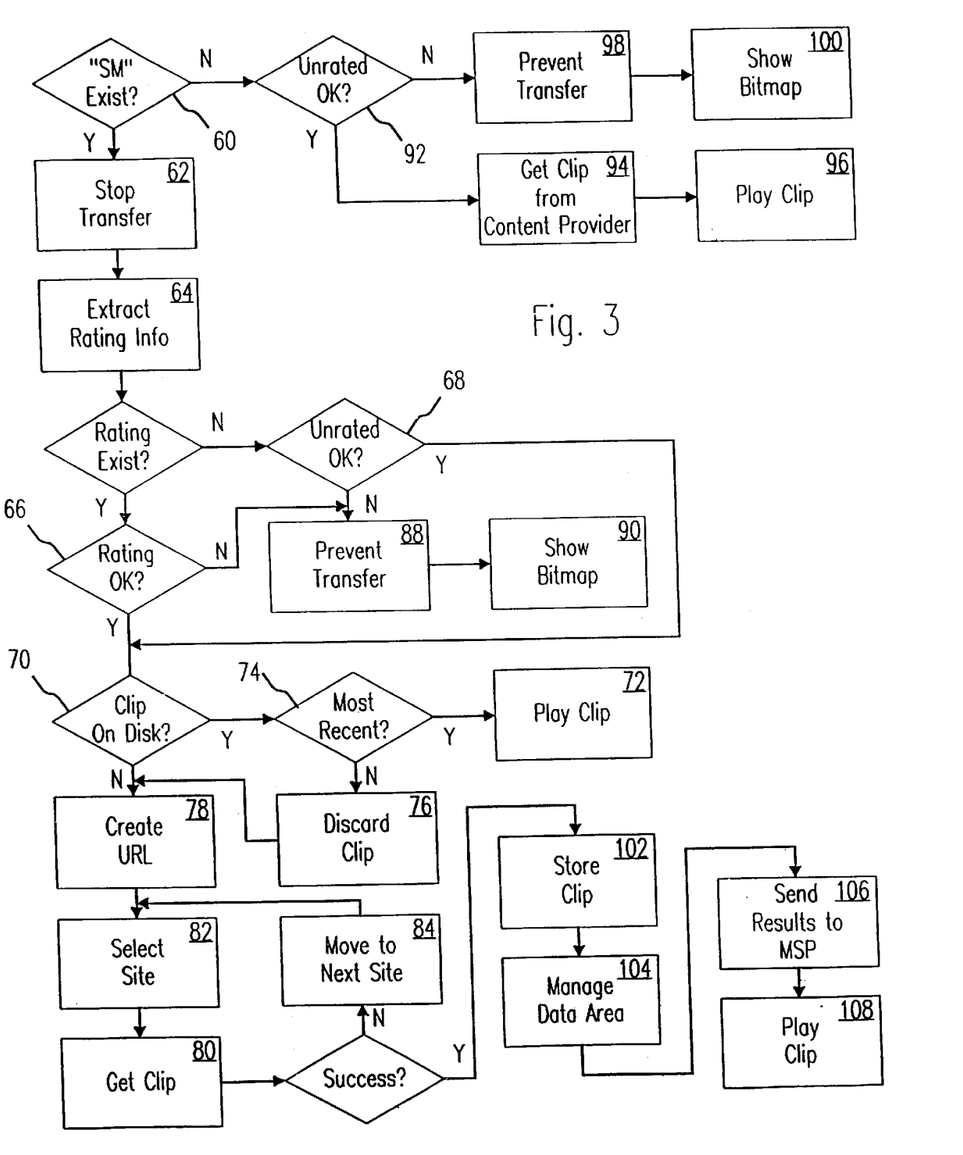
FIG. 3 is a flowchart describing the operation of a client program used in a system according to the invention.

The player program first analyzes the EMBED tag to determine if there is an "SM" (Smart Mirror) parameter (step 60); the presence of such a parameter indicates that the embedded clip is enabled for Smart Mirroring. Data associated with the "SM" parameter specifies the particular content provider from which the desired clip originated, as well as the group of mirror servers that particular content provider uses.

If the player program 36 determines that the EMBED tag references a video clip or other content handled by the system (step 62), the transfer of the embedded clip from the content provider 22 is stopped. The player program 36 then extracts access control or rating information from the EMBED statement (step 64), if any exists. This rating information is compared against the reference levels stored in the configuration file stored at the user terminal 12 (step 66). If rating information does not exist for the clip, the configuration file is queried to determine whether unrated clips, as defined below, may be played (step 68). Based on the foregoing information, the player program 36 will authorize or decline the viewing of the desired clip.

If playback is authorized, the player program 36 attempts to find the referenced clip on the local computer belonging to the user terminal 12 (Step 70). If it exists there, it is not re-downloaded, and can be played directly on the computer (from the disk or from RAM) (step 72). However, the time and date of creation of the clip on the local computer is first verified against the time and date for the clip available on the network, to determine if the stored clip is the most recent version (step 74). If it is not, the stored clip is discarded (step 76) and the download proceeds as follows.

If the clip does not exist on the local computer, the player creates a new URL (step 78) in the following form: "http://", plus the IP address of the selected Smart Mirror site stored in the configuration file, plus the path name to mirror files (e.g. "/pub/mirror/"), plus the name of the content provider taken from the "SM" parameter in the EMBED statement, plus the filename taken from the EMBED statement. The constructed URL is used to retrieve the selected clip from the appropriate Smart Mirror site selected by the configuration utility 34 (step 80). If more than one set of delivery sites exists for different content providers, the "SM" parameter is further used by the player program 36 to determine which Smart Mirror site in the configuration file is to be used in the constructed URL (step 82).

If the clip corresponding to the constructed URL is not found at the Smart Mirror site, or is unable to be accessed, then the download proceeds from the next-highest ranked Smart Mirror site in the configuration file (step 84). If all delivery sites fail, the download proceeds from the original content provider's site as specified directly by the EMBED statement.

If playback is disallowed, the player prevents the clip from being transferred (step 88) and displays a bitmap (step 90) advising the user that the download is not permitted.

If the player program 36 determines that the EMBED tag references a video clip or other content not handled by the system, the player will check whether the access control level set in the configuration file allows the user to play these clips or other files which are considered "unrated" (step 92). If so, the clip is transferred from its original content provider 22 by traditional means (step 94), and the player program 36 displays the downloaded file (step 96). If not, the player prevents the clip from being transferred (step 98) and displays a message (step 100) advising the user that the download is not permitted.

Upon download, the data file representing the desired clip is stored within a specified data area on the local computer, usually on the hard disk, belonging to the user terminal 12 (step 102). In one embodiment, this data area can be managed on a least-recently-used basis by the player program 36. That is, if no room in the data area remains for a new clip, the least-recently-used (or viewed) clip or clips can be discarded to make room (step 104).

In one embodiment of the invention, the client program 36 is capable of sending messages to the MSP 32 (step 106) to reflect whether downloads were successful. This message contains the Internet address of the user terminal 12, the identity of the selected server set, the Internet address of the site used to accomplish the download, the Internet addresses of all sites which failed, the name of the file downloaded, and the time to download the file. This information can also be used by the MSP 32 to track file downloads and to determine, in real time, whether there are any problems with any Smart Mirror sites.

Alternatively, the client program 36 can maintain a small local database of file transfer performance. Each download would then be timed. Specifically, information can be gathered on the time it takes a server to begin sending the requested file, the stability of the data transfer rate, and the error rate of the transfer. At some interval (e.g. weekly or once every 100 downloads), a message containing the accumulated file transfer performance information, as well as the user and server information discussed above, would be sent (automatically or upon request) to the MSP 32 (step 106) to update the MSP's database. This additional information increases the MSP's "knowledge" of network performance without incurring any additional testing overhead.

This data is especially valuable in ascertaining the performance of delivery sites, for the purpose of assessing the quality of service purchased from the delivery site provider, and for documenting the quality of service to content providers, to support the cost of the system. It is recognized, however, that much of the same information can be obtained through new users running the configuration utility 34.

Furthermore, the provision of download information to the MSP facilitates the use of the invention as a premium subscription-based service. As successful downloads are tracked in a database, each user can have an associated "account" to track charges. The user can be charged for use of the Smart Mirror system by the file, by the megabyte, by the month, or by other known means. In one embodiment, the EMBED tag associated with a file contains billing information, or a "price" for the file. The invention's tracking of download performance allows discounts or credits to be issued if downloads are found to be unduly difficult or slow.

To ensure that files stored on Smart Mirror delivery sites are used only by authorized users of the invention (e.g. those users having paid accounts), the files stored at the delivery sites can optionally be in encrypted form, and the downloading step described above can include a decryption step. Such encryption and decryption can be performed by well known means.

As discussed above, the clips managed by the invention can have content rating information associated therewith. This is accomplished by providing a "PG" parameter in the EMBED statement corresponding to the clip. In one embodiment, four characteristics are rated: nudity, sexuality, profanity, and violence. Accordingly, the PG parameter can be specified by a four-digit argument. Each characteristic is rated on a scale of one to three. One corresponds to no filtering (i.e. all content is allowable), two corresponds to some filtering (e.g. equal to levels typically allowed in broadcast television), and three corresponds to the most extensive filtering (e.g. for children). The ratings levels contained in the EMBED statement for a file are compared to the ratings filter levels contained in the configuration file stored at the user terminal 12 in the foregoing authorization process, and only authorized files are transferred.

Format Selection

The invention is capable of selecting a preferred file format from a plurality of available formats. Accordingly, the storage module 27 of the first delivery site 26 (FIG. 1) includes storage for a plurality of video clips in different formats. Four clips 116–119 are shown, although any number can be used under the system and method of the invention.

Likewise, the browser 38 (FIG. 1) has installed a plurality of CODECs. Three CODECs 110–114 are shown, although any number can be used under the system and method of the invention.

One embodiment of the format selection component of the invention will be described in conjunction with the flowchart of FIG. 4. The format selection process attempts to identify one of the video clips 116–119 as being in a preferred format that is both stored in the storage module 27 (FIG. 1) and supported by one of the CODECs 110–114 (FIG. 1).

Figure 4:
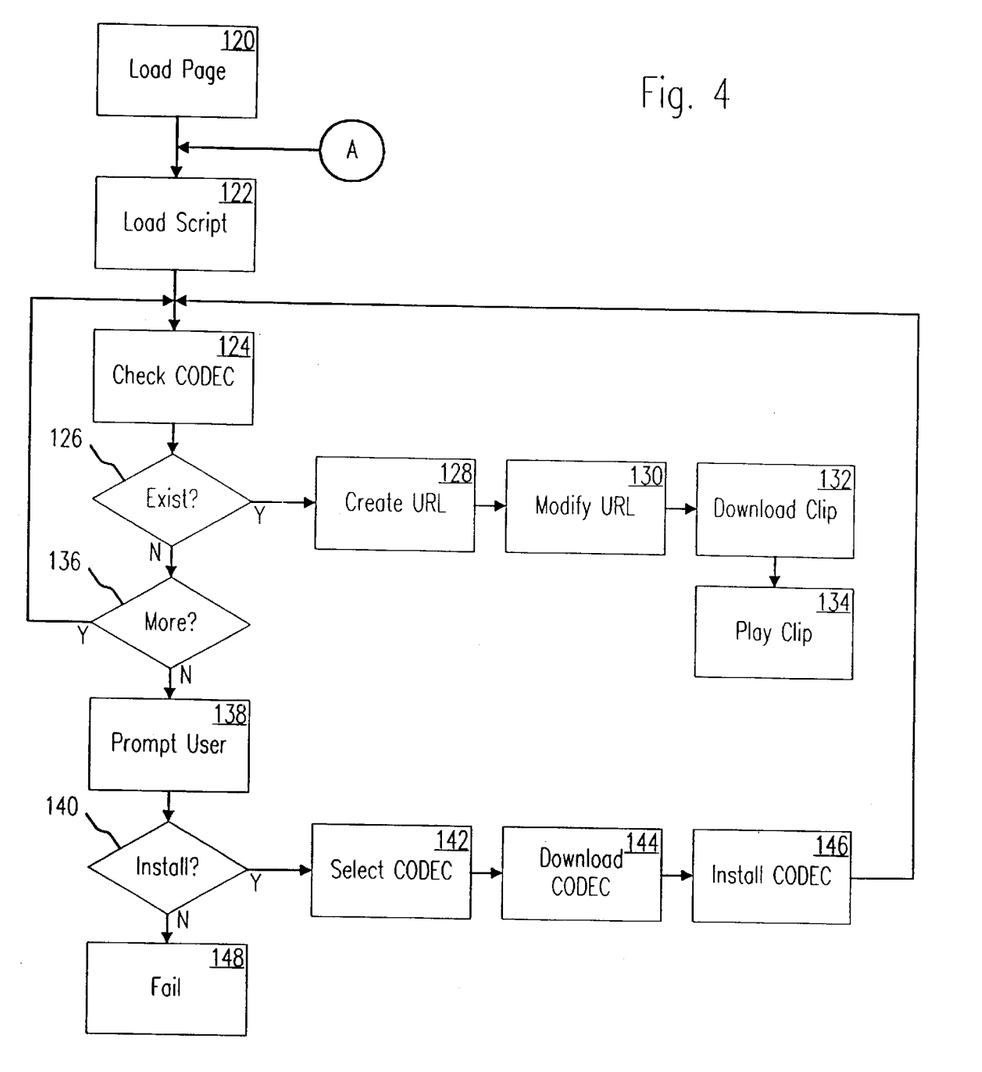
FIG. 4 is a flowchart describing the operation of an embedded program embodiment of the format selection module according to the invention.

A Web page embedding a reference to a video clip for use with the invention, as described in FIG. 4, also includes an embedded software program. This software program can be written in the JavaScript language, which is known in the art and compatible with a number of Web browsers presently available, including Netscape Navigator and Microsoft Internet Explorer.

First, the Web page containing the video clip is loaded by the user terminal (step 120). The embedded software program "script" is then read and interpreted (step 122) by the browser.

The embedded script specifies a sequence of preferred CODECs and corresponding video clip format types. Clips in each of the specified formats are stored on one or more delivery sites (FIG. 1). The CODECs are specified in the script in a prioritized order. If the first-listed CODEC is installed on the user terminal, it will be used. If only a lower-listed CODEC is installed, it will be used instead.

First, the embedded script queries the browser to check if a preferred CODEC is installed (step 124). If not (step 126), the embedded script verifies whether more CODECs are supported and available for use (step 136), and if so, returns and queries the browser again (step 124).

If one of the preferred CODECs is installed (step 126), a URL is created from the storage location of the video clip (step 128). For example, such a created URL might be "http://www.deliverysite.com/clips/watchme". Note that the created URL does not have a format type extension. The created URL is then modified (step 130) by appending a format type extension (e.g. ".mpg" for MPEG-formatted clips, or ".avi" for Microsoft Video for Windows-formatted clips) to the location of the video clip. The format type extension used depends on the selected CODEC. The resulting URL (e.g. "http://www.deliverysite.com/clips/watchme.mpg") uniquely specifies a video clip file in a format recognized by the preferred CODEC installed on the user terminal. This URL is then transmitted to the delivery site specified by the URL, and the clip is downloaded (step 132) and played (step 134). When the video clip file is received, the browser automatically invokes the proper CODEC for its display.

If all preferred CODECs have been checked (step 136) and none is installed on the user terminal, the embedded script prompts the user to install a preferred CODEC (step 138). If the user chooses to do so (step 140), the user can be given a further choice of CODECs to download (step 142), or this choice can be made automatically by the embedded script. The CODEC is then downloaded (step 144) and installed (step 146). The embedded script is re-executed to check for proper installation of the new CODEC, and to use it if it installed correctly (steps 124–134). If the user does not want to install a new CODEC, a failure message is displayed (step 148) and no video is downloaded or played.

Under certain circumstances, the installation of a CODEC (step 146) might not be accomplished automatically by the embedded script. For example, current versions of Netscape Navigator will not recognize a new plug-in until the application is exited and re-started. In such a case, the embedded script can, prior to downloading the CODEC, query the browser to determine what variety it is (e.g. Microsoft Internet Explorer or Netscape Navigator), and take alternative steps depending on the result of the query. In the latter case, for example, the embedded script can provide the user with instructions on how to manually install the downloaded CODEC. On the other hand, Microsoft Internet Explorer allows ActiveX controls, programs operable within the browser, to be downloaded and installed without user intervention; the embedded script can contain browser-dependent code to implement this feature. In a like manner, different CODEC programs can be selected for use with the different browser environments.

The above embodiment of the format selector module operates by appending a format type extension to an otherwise static URL referring to a video clip. Alternatively, the format selector module can be implemented such that alternative formats are stored at different delivery sites. In this alternative implementation, the URL is created (step 128) and modified (step 130) in one step;

each preferred CODEC causes an entirely unique URL, rather than only a unique file type extension, to be used. For example, "http://www.deliverysite.com/clips/watchme.mpg"might represent an MPEG version of a particular video clip, while "http://www.othersite.com/videos/watchme.avi"might represent an AVI version of the same clip.

It should be noted that the embodiment of the format selection module described with reference to FIG. 4 does not interact with the Smart Mirroring system as previously described. However, unique URLs for different clip formats can be used to spread demand for a certain clip across several delivery sites, thereby implementing a primitive form of mirroring.

A second, presently preferred embodiment of the invention is capable of file format selection in conjunction with mirror site selection. This embodiment, which uses an embedded software program ("script") along with a preinstalled plug-in program, will be described in conjunction with the flowchart of FIG. 5.

Figure 5:
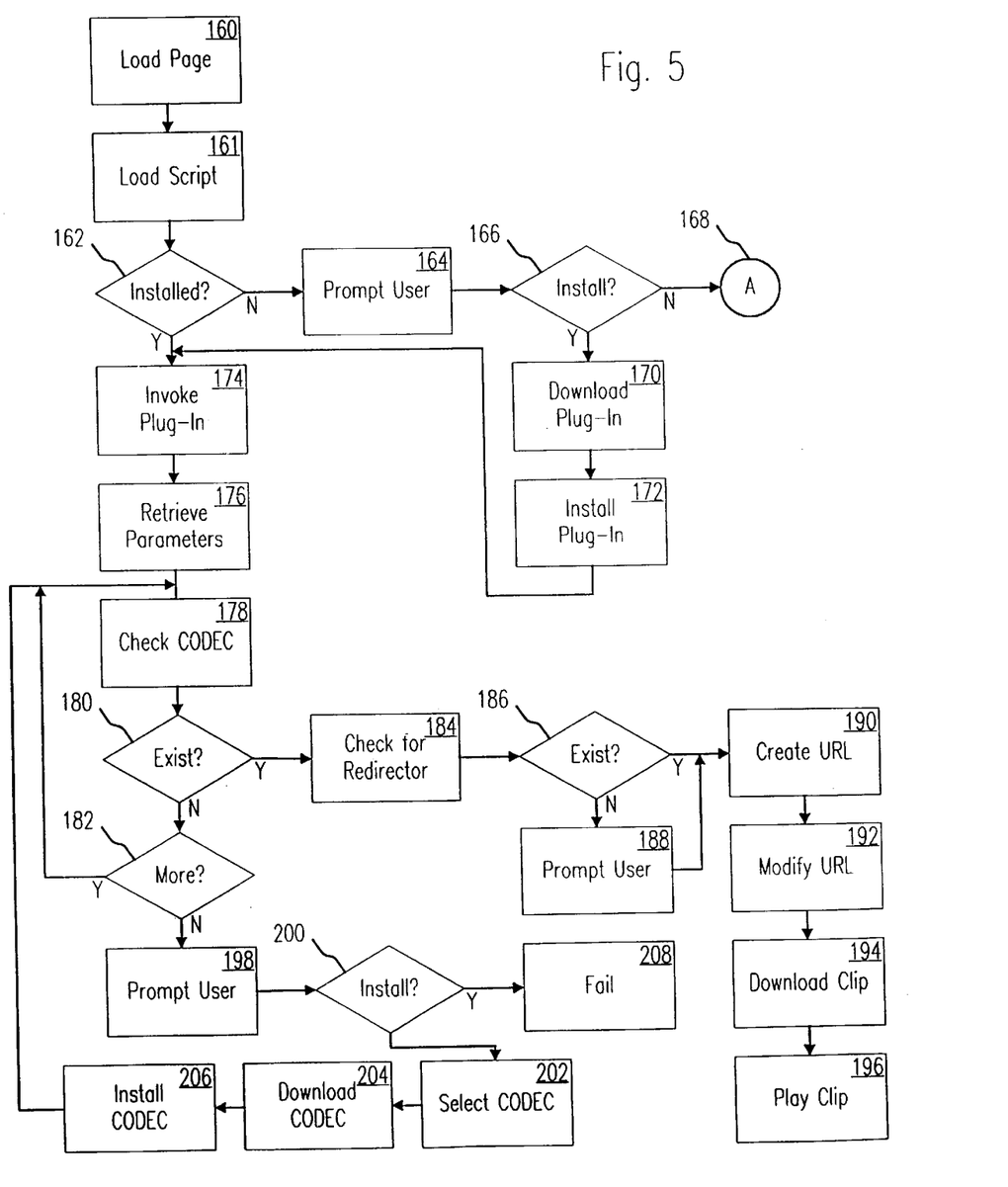
FIG. 5 is a flowchart describing the operation of a "plug-in" embodiment of the format selection module according to the invention.

First the Web page containing the video clip is loaded by the user terminal (step 160). The embedded software program "script" is then read and interpreted (step 161).

The embedded script verifies whether the format selection plug-in is installed (step 162). If not, the script gives the user an opportunity to download and install the plug-in (step 164). If the user does not want to install the plug-in (step 166), then the script proceeds as described in FIG. 4 (label "A", step 168, transferring control to step 122).

Otherwise, if the user wants to install the plug-in (step 166), the plug-in is downloaded (step 170) and installed (step 172). As discussed above, the plug-in might not be installable automatically by the script. If that is the case, the user can be given instructions to install it manually.

If the plug-in is already present, or the user has taken the appropriate steps to install it, the plug-in is then invoked by the embedded script (step 174). This can be accomplished by an "EMBED" statement specifying an embedded file having a type (or extension) associated by the browser with the format selection plug-in.

The EMBED statement also specifies parameters to be used by the plug-in for format selection. The plug-in retrieves those parameters (step 176) comprising a prioritized list of preferred CODECs and file type extensions.

The plug-in then, like the embedded script embodiment, queries the browser to determine whether a preferred CODEC is installed (step 178). If not (step 180), the plug-in verifies whether more CODECs are supported and available for use (step 182), and if so, returns and queries the browser again (step 178).

If a preferred CODEC is installed (step 180), the plug-in queries the browser to determine if the functions of a request redirector are available (step 184). The redirector implements the features of Smart Mirroring, as discussed above, and may be implemented as a separate plug-in from the format selector module, or may be implemented as part of the same plug-in. In either case, the functions of the redirector may or may not be available, depending on whether the user has subscribed to a Smart Mirroring service, configured the software properly, or other considerations. If the redirector is not available (step 186), the user is prompted to download and install the appropriate software (step 188).

Whether the redirector is available or not, a URL is then created by the plug-in (step 190) from the parameters passed in the EMBED statement. As discussed above in association with FIG. 4, the created URL comprises a static video location; the URL is then modified by appending a file type based on the preferred CODEC present on the user terminal (step 192).

The clip is then downloaded (step 194), either directly, or through the redirector (i.e. player program 36) implementing the Smart Mirroring feature of the invention, as discussed in conjunction with FIG. 3. Specifically, if the player program 36 is present, control is passed to step 60, which then handles the downloading of the clip. Playback (at step 72, 96, or 108) is accomplished by the appropriate CODEC, automatically invoked by the browser or the player program 36.

If the clip is downloaded directly (and the redirector features are not available), the clip is played by traditional means. However, the format selection plug-in may have associated with it a configuration file, containing a listing of delivery sites containing the video clips managed by the invention. Instead of using the URL stored on the Web page for the download of a clip, the plug-in can make a random selection from the list of delivery sites, and append the name of the clip and the preferred format type to that selected delivery site. The download can then take place (step 194) from the randomly selected delivery site. While this does not accomplish the Smart Mirroring method, it does accomplish a certain level of load distribution. Although the choice made at a particular user terminal might not be optimum for that terminal, video clip demand will be spread over a plurality of delivery sites.

When the video clip file is received, the browser automatically invokes the proper CODEC for its display (step 196).

If all preferred CODECs have been checked by the plug-in (step 182) and none is installed on the user terminal, the embedded script prompts the user to install a preferred CODEC (step 198). If the user chooses to do so (step 200), the user can be given a further choice of CODECs to download (step 202), or this choice can be made automatically by the plug-in. The CODEC is then downloaded (step 204) and installed (step 206). The plug-in then checks for proper installation of the new CODEC, and uses it if it installed correctly (beginning at step 178). If the user does not want to install a new CODEC, a failure message is displayed (step 208) and no video is downloaded or played.

As above, the installation of a CODEC (step 206) might not be accomplished automatically by the embedded script. Accordingly, a browser-dependent series of steps can be undertaken to either automatically install the CODEC or give the user instructions for manual installation, as discussed above in conjunction with FIG. 4.

The latter embodiment of the format selection module is described as having two primary functions: first, selecting the preferred CODEC and file format, and second, choosing a delivery site by way of the Smart Mirroring system and method. It should be noted that the precise order of these two operations is not of primary importance. Although the described embodiment performs format selection first and delivery site selection second, it is understood that the reverse order is equally functional, and may have certain advantages and disadvantages when compared to the disclosed embodiment.

In view of the above, it will be appreciated that embodiments of the invention may be employed in many different applications to permit the acquisition and analysis of performance data for networks between a given user and content provider or delivery site. Thus, although the described embodiment illustrates the system operating within the context of the Internet, it is recognized that such a system could prove to be useful in other network environments, such as corporate "intranets."

Moreover, although the illustrative embodiments are described primarily for use in a video delivery system, it should be recognized that a system according to the invention can be used to distribute various other kinds of computer data (e.g. application programs, database files and other business information, virtual reality files, multimedia such as Macromedia Shockwave files, and large text files such as books) as well. Such other types of data can be managed by the invention in different content provider groups as discussed in detail above; a different type of program (rather than the player program 36 or the CODECs) typically would be invoked at the user terminal 12 to view or use other types of data.

It should also be noted that certain functionality described as performed at the user terminal 12 (specifically, certain functions performed by the configuration utility 34, or client/player program 36) can be implemented as a standalone program, as a "plug-in" or "helper application" to run within a browser program, or as a Java applet downloaded from a delivery site to run within a browser environment. For user terminals capable of running the Microsoft Windows operating system, an environment known as Microsoft ActiveX is also useful, and can be used to implement software programs that operate similarly to "plug-ins" as described above.

What is claimed is:

1. A method for serving a media file in a preferred format, comprising:

storing copies of the media file on a set of delivery sites;

responsive to receipt at a content provider site of a request from a client, serving a page that includes a reference to the media file together with given code, wherein the given code is executable at the client to identify a preferred format for the media file;

locating a preferred delivery site from the set of delivery sites, wherein the step of locating a preferred delivery site comprises:

analyzing given network performance metrics; and selecting the preferred delivery site based on analysis of the given network performance metrics; and responsive to receipt at the preferred delivery site of a request for the media file in the preferred format, serving the media file in the preferred format.

2. The method as described in claim 1 wherein the set of delivery sites are located at Internet Points of Presence (PoPs).

3. The method as described in claim 1 wherein the preferred delivery site is electronically near the client.

4. The method as described in claim 1 further including the step of serving to the client a media player for use in rendering the media file in the preferred format.

* * * * *